Patented June 20, 1939

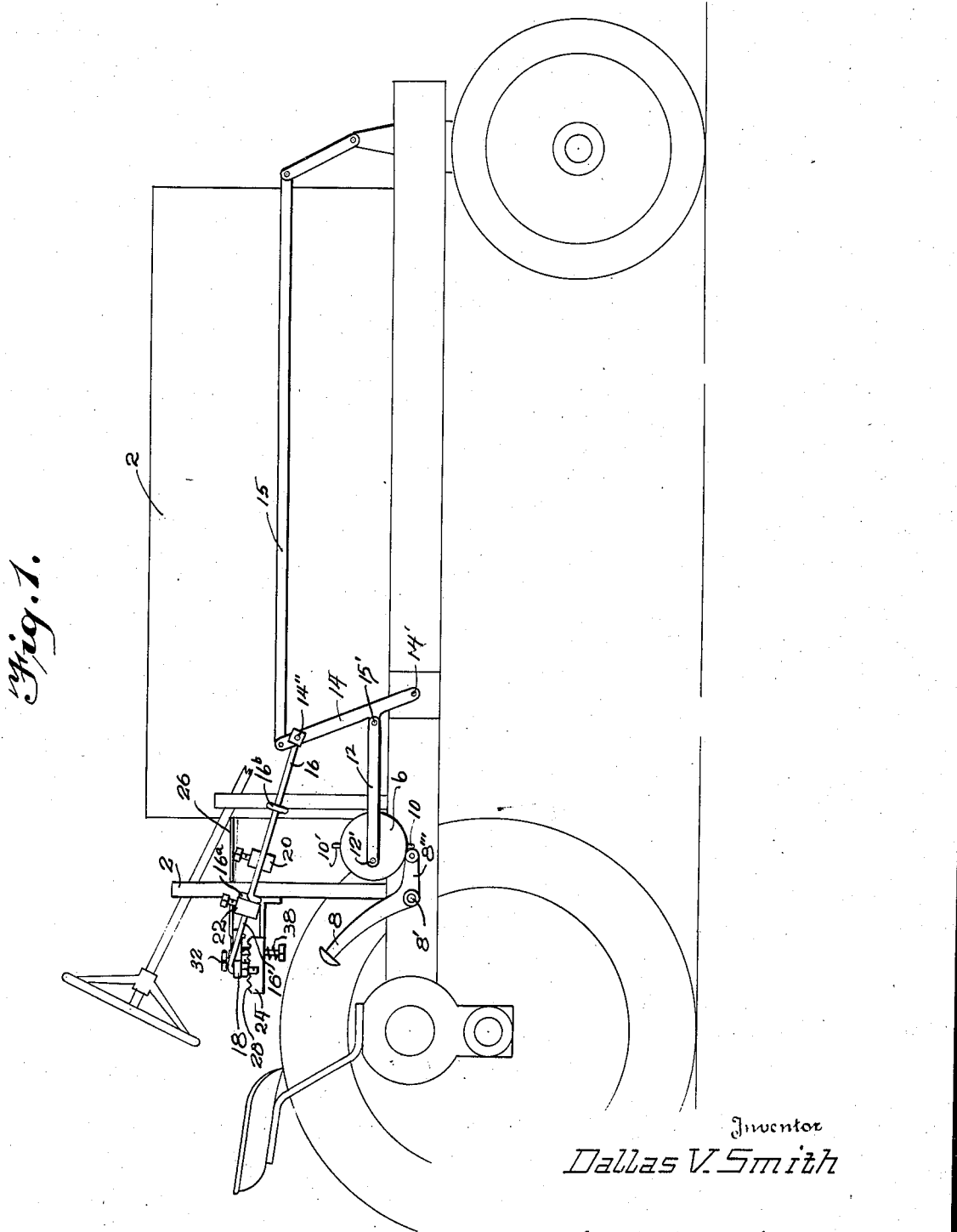

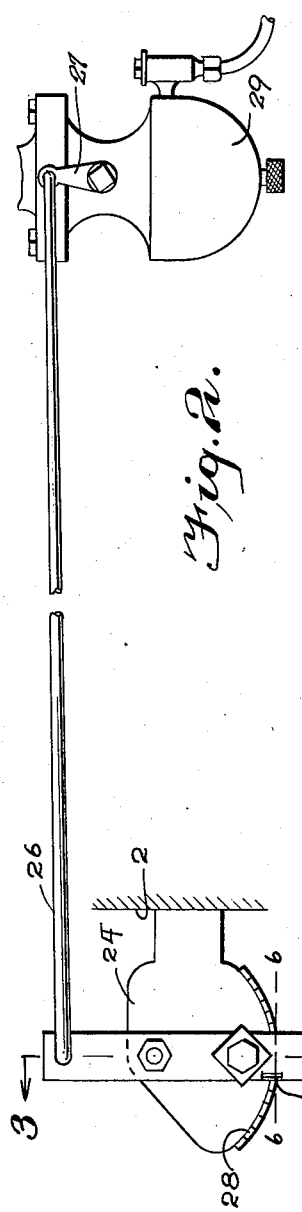
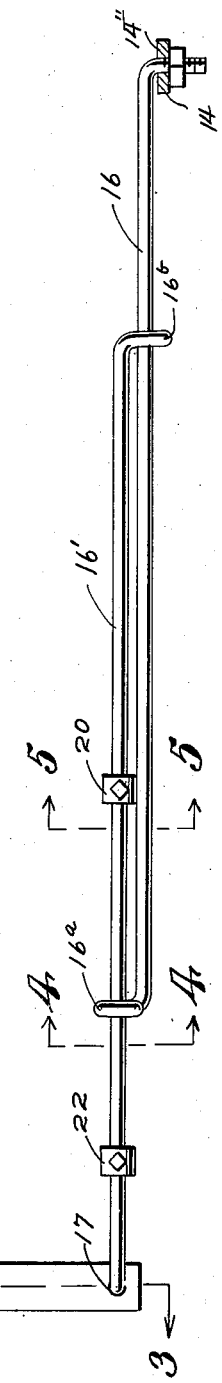
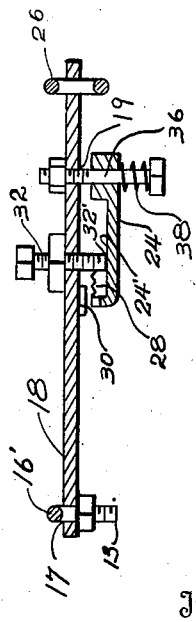

2,163,108

UNITED STATES PATENT OFFICE 2,163,108

AUTOMATIC SPEED CONTROL

Dallas V. Smith, Mount Pleasant, Iowa

Application July 6, 1938, Serial No. 217,807

1 Claim. (Cl. 180—77)

The present invention relates to a speed control for motor driven vehicles and particularly tractors. This type of motor driven vehicle is especially designed to draw heavy loads, such as trailers, farm implements, and the like. When the load is increased on the tractor it becomes necessary to increase its power by furnishing more fuel to the motor, therefore the fuel control throttle must be opened. When the load is reduced the throttle must be closed down in order to keep the motor from racing and increasing the speed of the tractor.

When a tractor is employed to draw agricultural implements such as plows, cultivators, and the like, there is generally a power lift connected with the implement and operated by the tractor motor, to raise the implement out of contact with the ground, in order that the implement may be moved, or transported from place to place.

When the plows are engaged in the soil there is a heavy load on the tractor and the throttle is set to furnish the proper fuel to the motor to operate the motor at a certain definite speed. When the plows are lifted from the ground the fuel must be reduced or the tractor will increase its speed, due to the release of the excess load. This is usually done by a hand throttle, which distracts the attention of the operator at a time when he is most concerned with the operation and positioning of the plows.

It is, therefore, the primary purpose of this invention to provide means associated with a tractor power lift for regulating the fuel control throttle in order that the throttle may be moved toward closed position when the lift is in position to disengage the plows, and open the throttle when the lift is in position to allow the engagement of the plows.

Another object of the invention is to provide a means of this character that will require a minimum of change in the fuel control mechanism.

Still another object of the invention is to construct a device that is practical, durable and economical to manufacture.

Still further objects of the invention will appear from the following specification taken in connection with the drawings, which form a part of this application, in which:

Fig. 1 is a view in side elevation of a tractor showing a power lift and the throttle control device attached thereto.

Fig. 2 is a top plan view on an enlarged scale of the throttle control device.

Fig. 3 is a detail sectional view of the throttle lever taken along line 3—3 of Fig. 2.

Fig. 4 is a sectional view taken along the line 4—4 of Fig. 2.

Fig. 5 is a sectional view taken along line 5—5 of Fig. 2.

Fig. 6 is a sectional view taken along line 6—6 of Fig. 2.

For convenience the present embodiment of the invention is illustrated and described in connection with a W. C. Allis-Chalmers tractor, a well known type in general use today.

The tractor 2 is provided with a conventional power plant, transmission and clutch assembly. Associated with the driving means of the tractor is a rotatable member 6, which is normally held from rotation by the foot pedal 8. The pedal 8 is pivoted at a point 8' and has an extension arm 8''' positioned to contact projections 10 and 10' extending outwardly from the rotatable member 6. These projections are designed to disengage the member 6 from its rotating mechanism when in contact with the arm member 8''' (not shown).

One end of a link 12 is eccentrically secured to the drum 6 at 12', the other end of the link being connected with the arm 14 at 15'. The lower end of the link 14 is pivotably connected to the tractor frame at 14' and adapted to be rocked by the rotating drum 6 through the link 12. Attached to the opposite end of the arm 14 is a link 15, which is associated with means for lowering and raising the plows, cultivators, and other implements in and out of operating position.

Connected also with the arm 14 at 14'' is a link 16 which is, in turn, connected with a slidable extension link 16'. The extension link 16' is connected with the throttle lever 18 at 17 (see Fig. 2). One end of the link 16 is provided with a loop 16ª, which is slidably receivable about the link 16'. Likewise, one end of the link 16' is formed in a loop 16ᵇ and is also slidably receivable over the link 16.

Located on each side of the loop 16ª are adjustable stop members 20 and 22 for regulating the amount of travel of the link 16' relative to the movement of the link 16. Although the stop members are positioned on each side of the loop member 16ª they may work equally as well located on the link 16 and positioned on each side of the loop member 16ᵇ. The stops may also be positioned, one on each of the links, and each adapted to contact one of the loop portions.

Referring in particular to Fig. 3, the throttle lever arm 18 is pivoted at 19 on a bracket 24, which is secured to some convenient part of the tractor 2. One end of the throttle lever has attached thereto the link 16' and the opposite end has attached thereto the link 26, which in turn, is connected with the lever 27 of a carburetor 29 supplying fuel to the tractor motor.

The bracket 24 is provided with a plurality of serrations or ridges 28 and the throttle lever is provided with a tooth or dog member 30 for engaging the same for normally holding the throttle lever in a set position when the throttle is to be manually manipulated.

The throttle lever is also provided with an adjustment screw 32, which is operatable to raise the throttle lever and the tooth member 30 out of contact with the serrations 28. This is done when the throttle lever is to be automatically operated through the power lift mechanism. The pin 36 about which the throttle lever is pivoted is provided with a spring 38, in order that the throttle lever may be raised to a point to prevent the serrations and the tooth member 30 from becoming engaged. When the lever 18 is elevated by the screw 32, the lever is supported by the lower end of the screw 32' bearing against the upper surface 24' of the bracket 24. In this position, as shown best in Figure 3, the lever 18 may be freely oscillated about the pin 36.

The double links 16 and 16' together with the stop members 20 and 22 provide means for automatically positioning the throttle lever into two definitely located positions upon the bracket 24. The adjustable stops 20 and 22 may be set to any desired position along the link for positioning the throttle at a predetermined point in either of the two positions of the lift operating means.

The automatic speed control is only used in conjunction with the power lift and when the tractor is used for other purposes it is detached from the throttle lever 18 and carried by a convenient support for that purpose, or removed altogether.

When it is desired to use the automatic control, the detached end 13 of the link 16' is inserted in the hole 17 of the throttle lever, and the screw 32, which is threaded in the throttle lever 18, is screwed down until the arm is supported as shown in Figure 3 on the upper surface of the bracket 24, in order that the tooth member 30 will not be in contact with the serrulations 28. This will allow the throttle lever to be freely moved by the connecting links 16 and 16' without interference.

When the speed control has been attached as described, the adjustable blocks 20 and 22 may be so located on the links 16 and 16' as to position the throttle lever and thus regulate the amount of fuel fed to the motor, in each of the two positions of the power lift arm 14. By this arrangement when the implements are lifted from contact with the ground the fuel feed is adapted to be closed down to a point which will make the tractor operate at the proper speed for turning and similar movements, and when the movements are completed and the implements are again lowered in working position, the automatic control opens the throttle at its pre-set working position.

While the invention has been illustrated and described in a particular form, it is not intended that it be limited to this particular disclosure and description of use, as the scope of the invention is best defined in the following claim.

I claim:

A throttle lever operating means for tractors having a power implement lifting means including means associated with said tractor for positioning the said lifting means in two normally stationary positions, said throttle operating means comprising two interconnected link members arranged in slidable relationship with each other, one of said link members being connected with the implement lifting means and the other said link member being connected with a throttle operating lever, adjustable stop means carried by one of said link members for moving the other said link member after a predetermined travel of the first mentioned link member for positioning the said throttle operating lever at a pre-set point in each of the two normally stationary positions of the implement lifting means, whereby the throttle will be moved toward closed position when the lifting means is in position for disengagement of the implements and open the throttle when the lifting means is in position for engagement of the implements.

DALLAS V. SMITH.